United States Patent [19]
Karl et al.

[11] Patent Number: 5,535,437
[45] Date of Patent: Jul. 9, 1996

[54] PORTABLE RADIO BATTERY LATCH

[75] Inventors: David H. Karl, Tamarac; Randall P. Chambers, Davie; Vito Dionisio, Jr., Sunrise, all of Fla.

[73] Assignee: Motorola, Inc., Schaumburg, Ill.

[21] Appl. No.: 402,723

[22] Filed: Mar. 13, 1995

Related U.S. Application Data

[63] Continuation of Ser. No. 113,579, Aug. 27, 1993, abandoned, which is a continuation of Ser. No. 848,593, Mar. 9, 1992, abandoned, which is a continuation-in-part of Ser. No. 709,045, Jun. 3, 1991, abandoned.

[51] Int. Cl.$^6$ .................................................. H04B 1/38
[52] U.S. Cl. ........................ 455/90; 455/128; 455/347; 455/351; 429/97
[58] Field of Search .................. 455/89, 90, 347, 455/348, 349, 351, 128; 379/61, 58, 445; 292/87, 38; 429/97, 99, 100, 121, 123, 98; 439/352, 353, 354, 357

[56] References Cited

U.S. PATENT DOCUMENTS

| | | |
|---|---|---|
| D. 277,747 | 2/1985 | Toth . |
| 3,728,664 | 4/1973 | Hurst ............................... 455/89 |
| 3,969,796 | 7/1976 | Hodsdon et al. ................. 455/90 |
| 4,371,594 | 2/1983 | Ohara et al. ..................... 429/97 |
| 4,815,980 | 3/1989 | Lauder et al. . |
| 4,904,549 | 2/1990 | Goodwin et al. ................ 429/97 |
| 4,986,766 | 1/1991 | Leonard et al. ................. 439/354 |
| 4,993,967 | 2/1991 | Matsumoto ...................... 439/352 |
| 5,028,083 | 7/1991 | Mischenko . |
| 5,092,788 | 3/1992 | Pristupa, Jr. et al. ........... 439/352 |
| 5,415,955 | 5/1995 | Kobayashi et al. .............. 429/97 |

FOREIGN PATENT DOCUMENTS 0445808  9/1991  European Pat. Off. ............. 455/89

*Primary Examiner*—Reinhard J. Eisenzopf
*Assistant Examiner*—Nguyen Vo
*Attorney, Agent, or Firm*—Juliana Agon; Kenneth M. Massaroni

[57] ABSTRACT

A latch (16) for latching or locking a battery housing (14) to a portable radio housing (12) automatically locks into place when it is placed in the radio, and automatically ejects the battery housing when it is unlocked. The latch is movable from a first position, in which the battery housing is locked to the portable radio, to a second position, in which the battery housing is unlocked from the radio, and movable from the second position to the first position. The latch comprises a spring biasing apparatus (18) for attaching the latch to the housing, retainer apparatus (22) for locking the battery housing to the radio, and a spring finger member (20) for ejecting the battery housing from the radio housing when the latch is moved from the first to the second position.

3 Claims, 5 Drawing Sheets

FIG.1
FIG.2
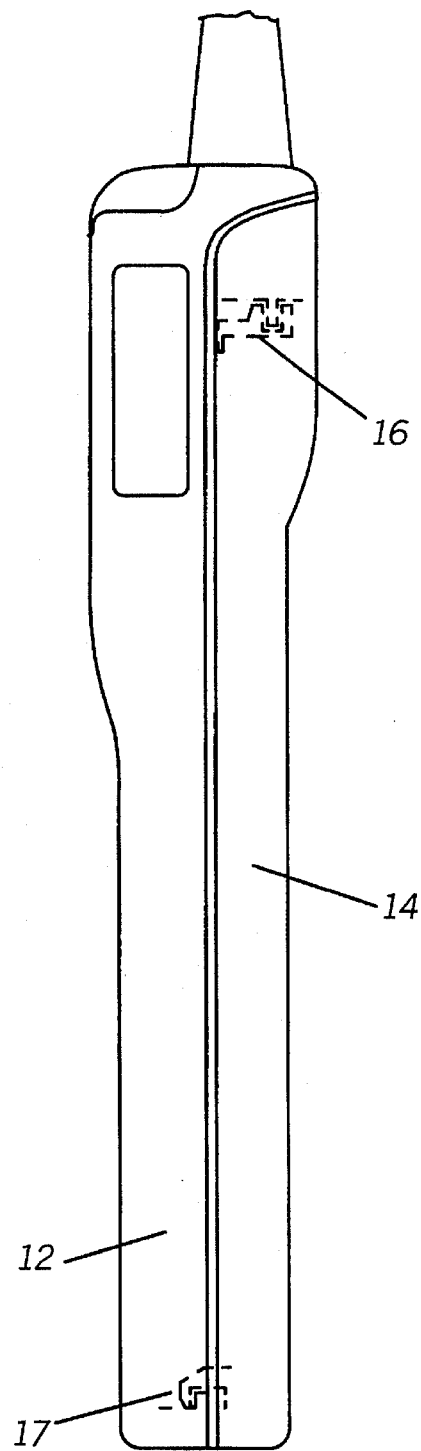
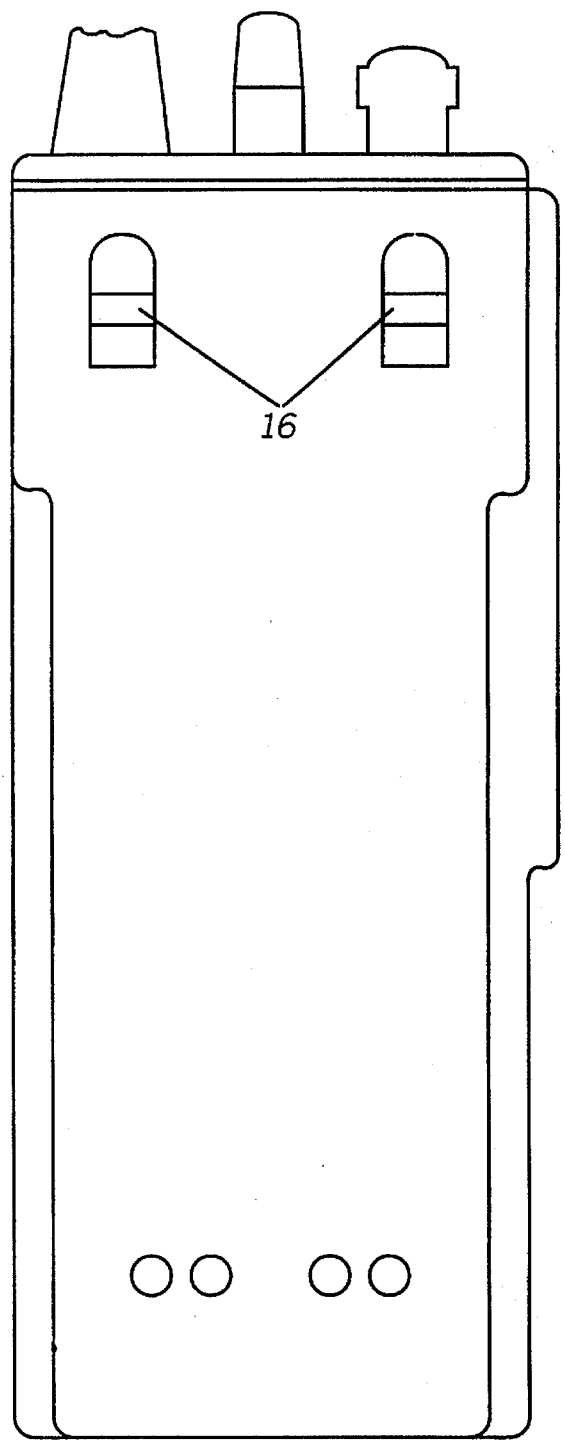

5,535,437

PORTABLE RADIO BATTERY LATCH

This is a File Wrapper continuation of U.S. patent application No. 08/113,579, now abandoned, which was a File Wrapper continuation of U.S. patent application No. 07/848,593 filed Mar. 9, 1992, now abandoned, which is a continuation-in-part of application Ser. No. 07/709,045 filed Jun. 3, 1991, now abandoned.

TECHNICAL FIELD

This invention relates generally to portable radio batteries, and more specifically to latches for radio batteries.

BACKGROUND

Portable radios must be designed so that the batteries do not easily come off. However, ease of removal and insertion of a battery pack in a radio is desirable feature. Accordingly, a need exists for a latch that facilitates insertion of the battery pack into the radio housing and removal therefrom, while providing protection against accidental removal.

SUMMARY OF THE INVENTION

Briefly, according to the invention, a latch, located at a first end of a first housing latches the first end of the first housing to a first end of a second housing. The latch comprises a first spring member for biasing the latch toward a latched position, and a second spring member for ejecting the first housing from the second housing when the latch is moved from the latched position to an unlatched position, and a retainer member for latching the first end of the first housing to the first end of the second housing.

BRIEF DESCRIPTION OF THE DRAWINGS

FIG. 1 is a side view of a radio having a battery housing with a latch in accordance with the invention.

FIG. 2 is a rear view of the radio shown in FIG. 1.

DETAILED DESCRIPTION OF THE PREFERRED EMBODIMENT

Figure 3:
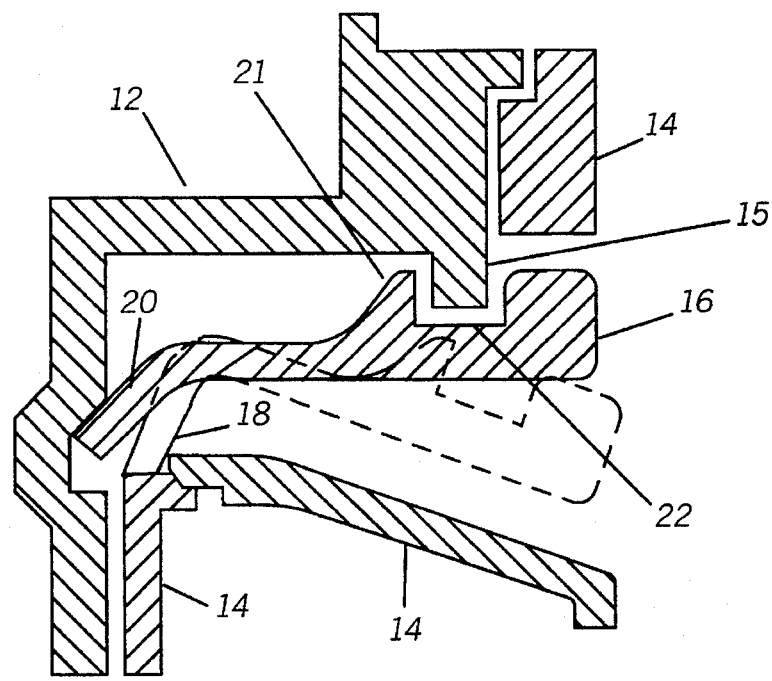
FIG. 3 is a sectional view, taken along the line A—A in FIG. 4, of the part of the radio including the latch.

Referring to FIG. 1, there is shown a side view of a radio 10 having a radio housing 12 and a battery (or other energy source) housing (or pack) 14 that attaches to the radio housing 12. The battery housing includes a latch 16 (shown by broken lines) which locks the battery housing 14 to the radio housing 12. The battery housing 14 also includes a hook 17 that hooks into a hook receiver in the corresponding end of the radio housing 12 to provide a pivotal support. Thus, the battery housing 14 hooks at one end and latches at the opposite end to force the user to move the latch and physically grab and remove the battery pack while maintaining deflection of the latch.

Referring to FIG. 2, there is shown a rear view of the radio 10 shown in FIG. 1. In this embodiment, two latches 16 are used to lock the battery housing 14 to the radio housing 12. Dual latches are used to force the user to remove the battery only when he wants it off, thus preventing inadvertent removal of the battery. However, it is possible to implement the invention with only one latch in accordance with the invention.

Referring to FIG. 3, there is shown a sectional view of the part of the radio including the latch 16. In the preferred embodiment the latch 16 is molded into the battery housing 14 via support arms 18. The support arms 18 are resilient so as to provide a means for biasing (or urging) the latch toward the latched position shown in this figure. The latch 16 also includes a spring finger ejector 20 which provides a self-ejecting feature. This flexible plastic piece is activated when the latch 16 is deflected. When the latch is engaged (i.e., locking or latching, the battery housing 14 to the radio housing 12) the spring finger 20 is not engaged (i.e., it is not exerting a spring force on anything). Thus, the latch does not take a "set" in the locked position. When the user of the radio 10 wishes to remove the battery pack 14 from the radio housing 12, he would deflect the outer ends of the latches 16, thus unlocking the battery housing 14 from the radio housing 12. As each latch is moved to release the battery housing 14, the ejector members 20 spring the battery pack off the housing. This ejection motion helps the user to only have one direction of movement to release the battery pack 14 from its nested position in the radio 10.

Referring again to FIG. 3, the unlocked (or unlatched) position of the latch 16 is shown in broken lines. Self-ejection is accomplished by the spring force of the spring member 20 against an interior wall or slot in the radio housing 12. That force pushes the battery housing 14 outward, making removal easier.

The latch 16 also includes a self-locking feature. This feature is realized when the user inserts the battery pack into the radio housing 12. First, the lower end is inserted and the lower latch 17 is engaged. Then the battery housing is pivoted into its locked position. A protrusion 15 in the radio housing 12 slides along a slope 21 in the latch 16 until the latch locks into place. The latch 16 is made from a resilient plastic material so that it moves into its "locked" position when the protrusion 15 is beyond the slope 21.

Figure 4:
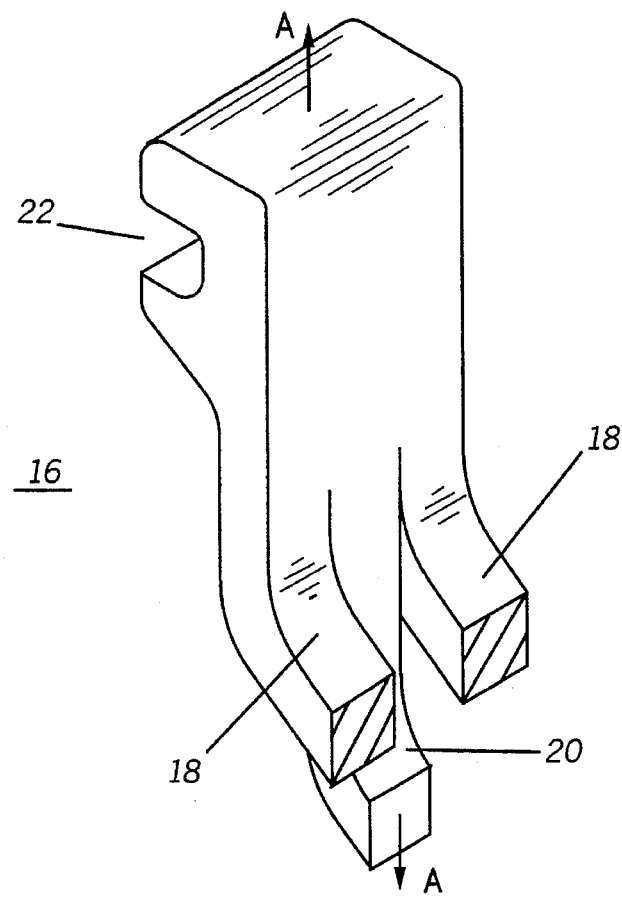
FIG. 4 is an isometric view of a latch in accordance with the invention.

FIG. 4 shows an isometric view of a latch in accordance with the invention. The outer end of the latch 16 includes a retainer 22 which provides a locking function on the protrusion 15 on the radio housing 12. The latch may be made from any suitable resilient material such as polycarbonate. In the preferred embodiment the latch is molded as an integral part of the battery housing, but other implementations may be apparent to those skilled in the art.

Figure 5:
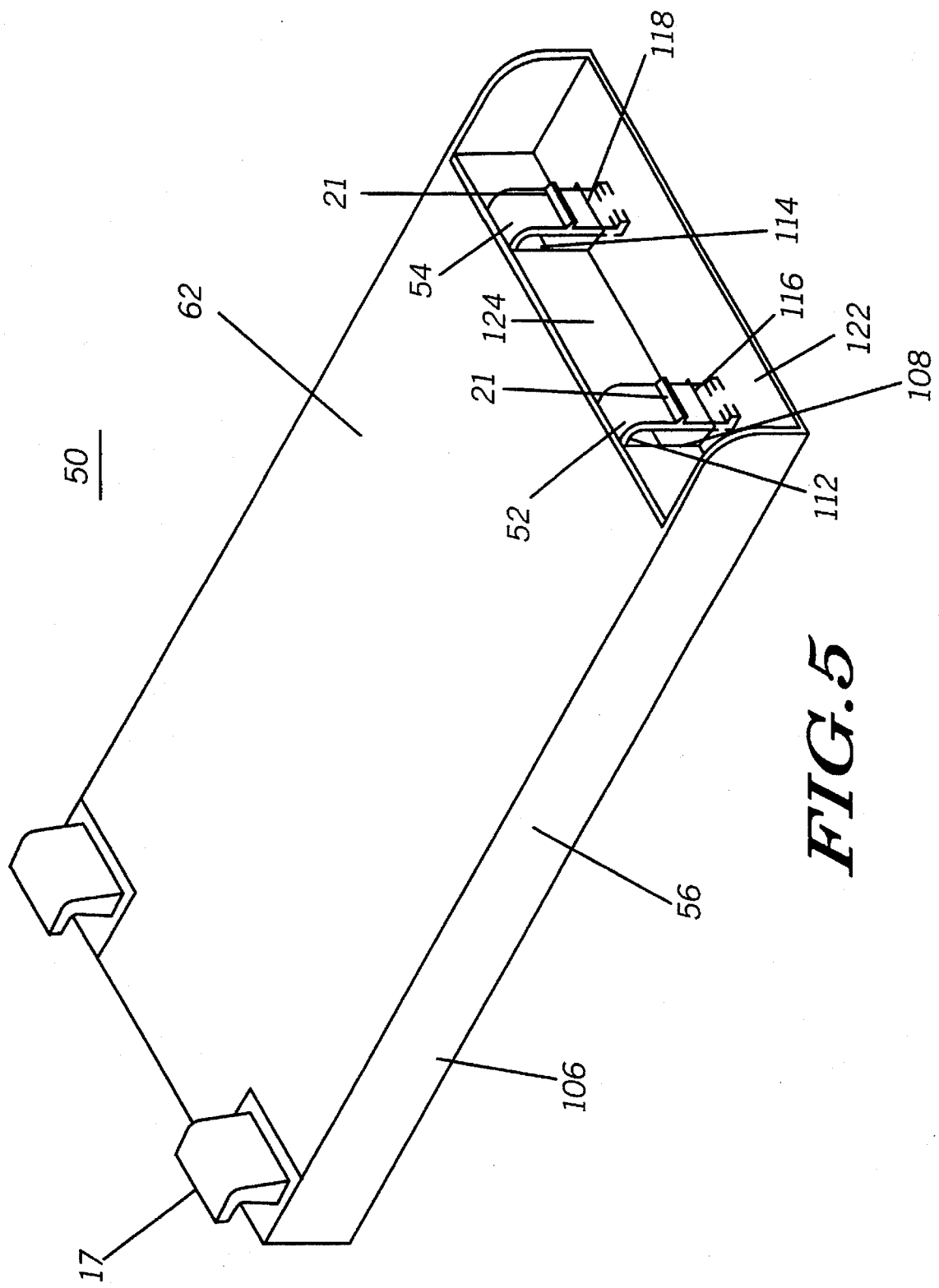
FIG. 5 is a rear perspective view of an alternate battery pack in accordance with the present invention.
Figure 6:
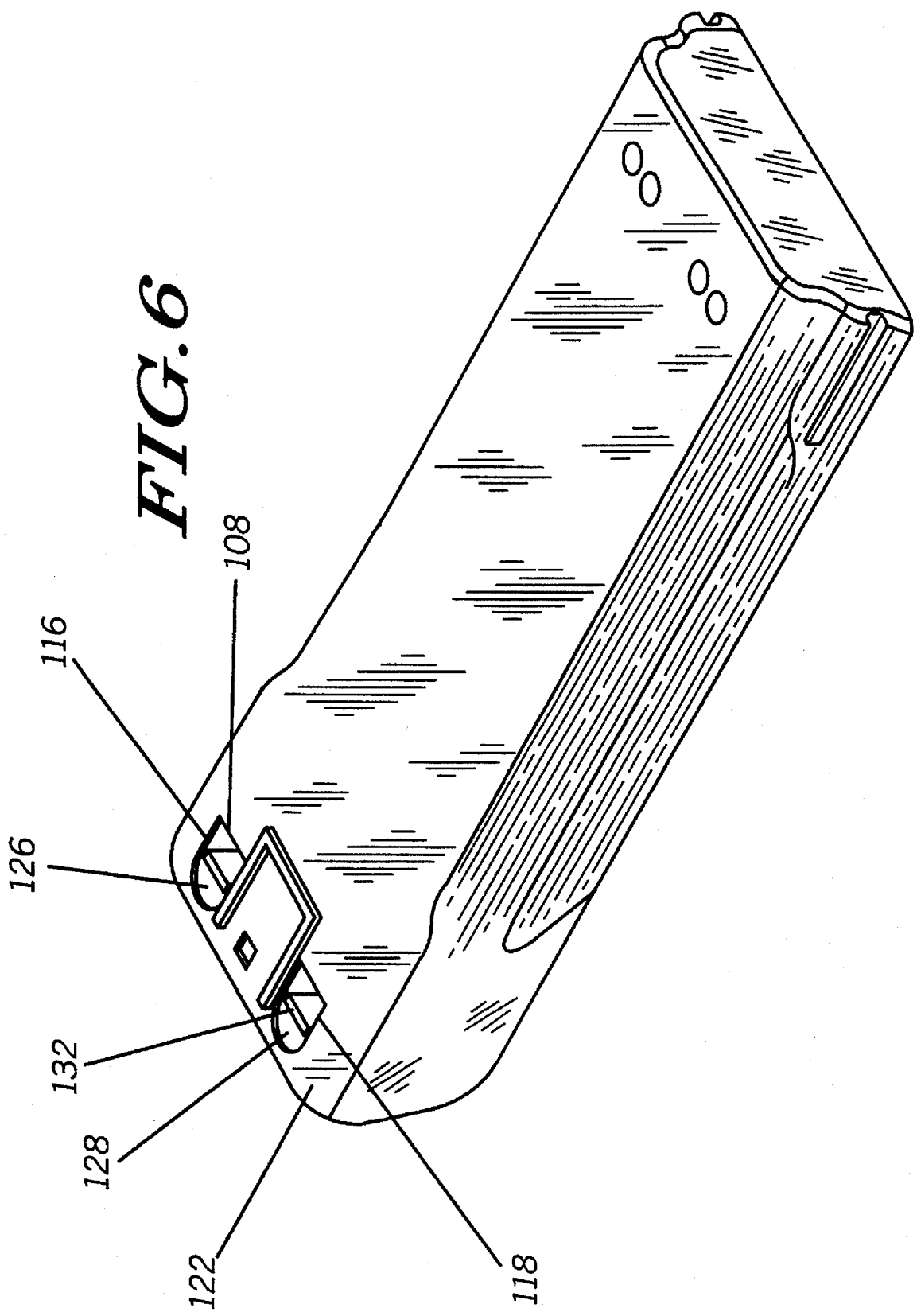
FIG. 6 is a top perspective view of the alternate battery pack of FIG. 5.

Referring to FIG. 5, there is shown a perspective view of an alternate battery or battery pack 50 having a battery housing 56 and a battery cover 62, where the same reference numbers refer to similar features. The rear portion of the housing portion, or the battery door or cover 62, could be integrally formed with the battery housing 56 or separately attached and then preferably ultrasonically welded together once battery cells (not shown) have been placed inside.

The latches 16 of FIGS. 1–4 have been modified by removing the spring finger ejector 20 to form a pair of living hinges 52 and 54. Even though these hinges and the associated capturing features surrounding them may have different numbers to denote different placement, the hinges (and their corresponding capturing features) can be the same in structure.

Figure 7:
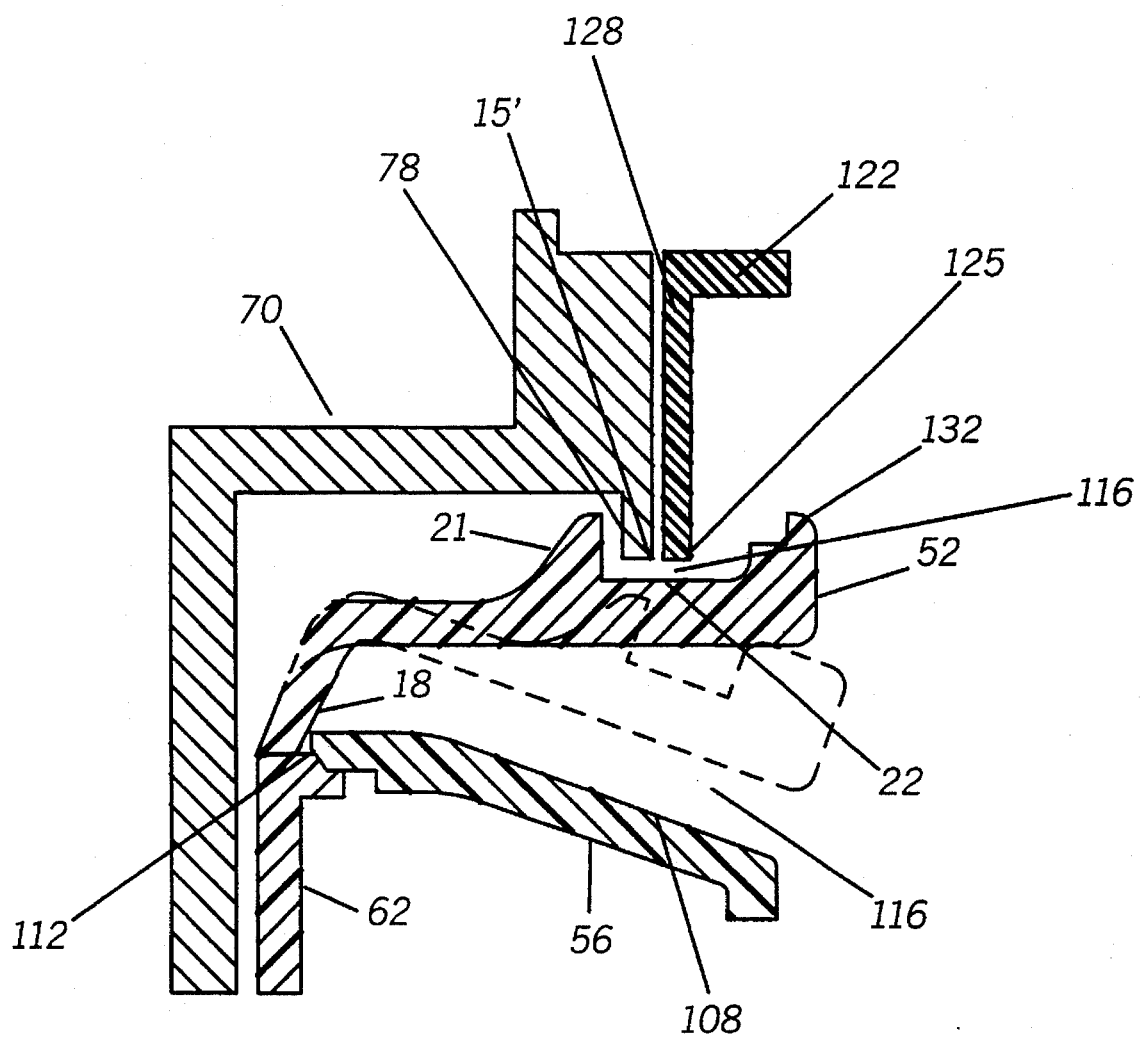
FIG. 7 is a sectional view of the part of the modified radio including the modified latch of FIG. 5, compared to the unmodified assembly of FIG. 3.

The living hinges 52 and 54 each still have a kink, bend, or slope 21 for engaging a protrusion, or upper ledge 15' of an interior wall, defining a recess, or slot 78 in a modified radio housing or chassis 70, as shown in FIG. 7. These living hinges 52 and 54 are each rigidly fixed on and projected from the battery cover 62 and emanate from a pair of notches 112 and 114, protruding through a pair of openings or slots 116 and 118 of the battery housing 56.

The portion of the battery housing containing the slots 116 and 118 form a housing over-travel limiting plastic skirt, detent, or protective sheath 122 that inhibits over-travel and damage by the living hinges 52 and 54 being bent too far, either inwardly or outwardly, or twisted in any direction, even when the battery pack is removed from the protection of the radio housing 70. The skirt 122 extends from a battery cell compartment portion 106 of the battery housing and intersects an inner wall 124 of the battery cell compartment portion 106. When the battery housing 56 and the battery cover 62 are suitably joined together, the living hinges 52 and 54 slip through the two receiving slots 116 and 118 of the skirt 122 of the battery housing 56. Since the living hinges 52 and 54 are captured by the slots 116 and 118 (the slots being formed on one end by a recessed edge 125 and the inner wall 124 on the other end) in the battery housing 56, the travel of the latches is restricted from moving beyond the plastic's yield limit in any direction.

To facilitate removal of the battery 50, an inner wall portion 108 is sloped downwardly (shown in FIG. 7) from a pair of finger indented recesses 126 and 128 on the outward or topside of the skirt 122 (shown in FIG. 7) where the outer ends 132 of the living hinges protrude above the slots 116 and 118 and their respective recesses 126 and 128. The finger indented recess 126 and 128 and the sloped inner wall portion 108 thus allow easy latch access from the outside of the battery housing 56. When the user of the radio 10 wishes to remove the battery pack 50 from the radio housing 70, he or she would deflect the outer ends 132 of the latches 16, thus unlocking the battery pack 50 from the radio housing 70.

At the same time, the access is purposely designed to be very limited on the inside of the battery housing 56. Referring to FIG. 7, a first protrusion 15' in the radio housing 70 slides along the slope 21 in the latch 52 until the latch locks into place (when the first protrusion 15' is beyond the slope 21). A side edge of the recess 126 forming one end of the slot 116 provides a second protrusion 125 in the battery housing 56. The outer end of the latch 52 includes the retainer 22 which provides a locking function on both the first protrusion 15' on the radio housing 70 and the second protrusion 125 in the battery housing 56.

In summary, only two piece parts, the battery cover and the battery housing, are used to house, cover, and protect a double lock and latch mechanism. Thus, a battery pack latch is provided which facilitates insertion of the battery pack into a radio housing and removal therefrom, while preventing accidental removal.

What is claimed is:

1. A housing for an energy source for powering an electronic device when said energy source is attached to said electronic device, said electronic device having a chassis with two ends, the first end of the chassis having two hook receivers, the second end of the chassis having an interior wall extending substantially perpendicular therefrom, a protrusion extending from the wall located remotely from the chassis, said housing comprising:

a cover portion having two ends;

two hooks extending from said cover at the first end thereof for engaging said two hook receivers;

an outward side parallel to the cover portion, the outward side defining a plane;

an inner wall formed between the outward side and the cover portion having a downwardly sloped portion;

a protective sheath extending from the outward side along the same plane, two finger recesses on the outward side each having a slot located therein, the protective sheath aligns with the interior wall of the chassis when the housing is in a latched position;

two latches extending from the cover portion over the downwardly sloped portion of the inner wall, each of said latches having a resilient support arm, an outer end located remotely from the support arm, and a sloped portion disposed intermediate the support arm and outer end for engaging the protrusion of the interior wall of the chassis, the outer end extending through the slot in the protective sheath so as to limit over travel of said latches; and the engagement of the two hooks with the two hook receivers provides a pivotal support so that the housing can be pivoted into the latched position.

2. The housing of claim 1, wherein the outer end of the two latches each includes a retainer.

3. The housing of claim 1, wherein the energy source is a battery pack.

\* \* \* \* \*